US011758494B2

(12) United States Patent
Cantelmo et al.

(10) Patent No.: US 11,758,494 B2
(45) Date of Patent: Sep. 12, 2023

(54) TRUSTED DISSEMINATION OF A REFERENCE TIME SCALE TO USER TERMINALS

(71) Applicant: Thales Alenia Space Italia S.p.A. Con Unico Socio, Rome (IT)

(72) Inventors: Claudio Cantelmo, Turin (IT); Marco Bianchi, Turin (IT)

(73) Assignee: Thales Alenia Space Italia S.p.A. Con Unico Socio, Rome (IT)

( * ) Notice: Subject to any disclaimer, the term of this patent is extended or adjusted under 35 U.S.C. 154(b) by 616 days.

(21) Appl. No.: 16/646,863

(22) PCT Filed: Sep. 10, 2018

(86) PCT No.: PCT/IB2018/056876
§ 371 (c)(1),
(2) Date: Mar. 12, 2020

(87) PCT Pub. No.: WO2019/053575
PCT Pub. Date: Mar. 21, 2019

(65) Prior Publication Data
US 2020/0280944 A1 Sep. 3, 2020

(30) Foreign Application Priority Data
Sep. 13, 2017 (IT) .................. 102017000102599

(51) Int. Cl.
*H04L 43/106* (2022.01)
*H04W 56/00* (2009.01)
(Continued)

(52) U.S. Cl.
CPC ........ *H04W 56/0015* (2013.01); *G04G 5/002* (2013.01); *G04G 7/02* (2013.01);
(Continued)

(58) Field of Classification Search
CPC ..... H04L 29/02; H04L 43/106; H04L 9/3297; H04L 43/067; H04W 56/0065;
(Continued)

(56) References Cited

U.S. PATENT DOCUMENTS

| 2003/0110394 A1* | 6/2003 | Sharp ................. H04L 63/1408 713/161 |
| 2007/0005984 A1* | 1/2007 | Florencio .............. H04L 9/3226 713/178 |

(Continued)

FOREIGN PATENT DOCUMENTS

| JP | 2008 283235 A | 11/2008 |
| KR | 2007 0069732 A | 7/2007 |

OTHER PUBLICATIONS

Tavella, et al., The Horizon 2020 DEMETRA Project: DEMonstrator of EGNSS Services Based on Time Reference Architecture, 2015, IEEE Metrology for Aerospace (Metroaerospace, IEEE, Jun. 4, 2015, pp. 98-102.

(Continued)

*Primary Examiner* — Salvador E Rivas
(74) *Attorney, Agent, or Firm* — McCarter & English, LLP

(57) ABSTRACT

A Reference Time Scale Dissemination System (RTS-DS) is provided that includes a RTS Dissemination Data Provider (RTS-DDP) and a User Terminal. The RTS Dissemination Data Provider is equipped with a radio receiver designed to receive radio signals and to compute a RTS-DDP Computed Time Scale based on received radio signals. The User Terminal (UT) is equipped with a Radio Receiver designed to receive radio signals and to compute a UT Computed Time Scale based on received radio signals, and with a Clock Device designed to be locked to the UT Computed Time Scale and to provide a UT Local Time Scale resultingly locked to the UT Computed Time Scale. The RTS-DPP (Continued)

is designed to receive a Reference Time Scale, and compute, at a RTS-DDP Computed Time, Time Quantities indicative of a difference between the RTS-DDP Computed Time Scale and the received Reference Time Scale, including a Time Scatter indicative of a difference between the RTS-DDP Computed Time and a corresponding Reference Time, and a Time Offset indicative of a mean value, computed over a timespan, of a number of differences between RTS-DDP Computed Times and corresponding Reference Times.

12 Claims, 5 Drawing Sheets

(51) Int. Cl.
| | | |
|---|---|---|
| G04G 5/00 | (2013.01) | |
| G04G 7/00 | (2006.01) | |
| H04J 3/06 | (2006.01) | |
| H04B 7/26 | (2006.01) | |
| H04W 84/06 | (2009.01) | |
| H03K 5/135 | (2006.01) | |
| H04L 9/32 | (2006.01) | |
| H02P 6/15 | (2016.01) | |

(52) U.S. Cl.
CPC .......... *H04B 7/2678* (2013.01); *H04J 3/0635* (2013.01); *H04J 3/0658* (2013.01); *H04J 3/0679* (2013.01); *H04L 43/106* (2013.01); *H04W 56/0065* (2013.01); *H02P 6/15* (2016.02); *H03K 5/135* (2013.01); *H04L 9/3297* (2013.01); *H04W 84/06* (2013.01)

(58) Field of Classification Search
CPC ...... H04J 3/0679; H04J 3/0635; H04J 3/0658; H02P 6/15; H03K 5/135; H04B 7/2678
See application file for complete search history.

(56) References Cited

U.S. PATENT DOCUMENTS

| | | | |
|---|---|---|---|
| 2009/0117928 A1* | 5/2009 | Ladd | H04B 7/2662 |
| | | | 455/502 |
| 2009/0195443 A1 | 8/2009 | Levin et al. | |
| 2010/0245172 A1* | 9/2010 | Gottifredi | H04B 7/2693 |
| | | | 342/450 |
| 2015/0301190 A1* | 10/2015 | Osipov | G01S 19/43 |
| | | | 342/357.26 |
| 2018/0011199 A1* | 1/2018 | Lombardi | G01S 19/14 |
| 2018/0278623 A1* | 9/2018 | Koskimies | H04L 9/3239 |

OTHER PUBLICATIONS

Tavella P. et al, Time Dissemination Services: The Experimental Results of the European H2020 DEMETRA Project, 2016 IEEE International Frequency Control Symposium (IFCS), IEEE May 9, 2016, pp. 1-5.

PCT International Search Report and Written Opinion for PCT/IB2018/056390 dated Oct. 30, 2018.

\* cited by examiner

TRUSTED DISSEMINATION OF A REFERENCE TIME SCALE TO USER TERMINALS

CROSS-REFERENCE TO RELATED APPLICATIONS

This application is a 35 U.S.C. § 371 National Stage filing of International Application No. PCT/IB2018/056876, filed on Sep. 10, 2018, which application claims priority from Italian Patent Application No. 102017000102599, filed on Sep. 13, 2017, the disclosure of which is incorporated herein by reference.

TECHNICAL FIELD OF THE INVENTION

The present invention relates to trusted dissemination of a Reference Time Scale to User Terminals.

The present invention finds advantageous but not limitative application to User Terminals (UTs) equipped with Global Navigation Satellite System (GNSS) radio receivers designed to receive radio Signals in Space (SIS) broadcasted by a GNSS satellite constellation, and to locally compute a GNSS Time Scale based on received GNSS SIS, and to which the following description will refer without, however, losing generality.

Nevertheless, the present invention may also find application to User Terminals equipped with other types of radio receivers designed to receive radio time signals based on which a Time Scale may be locally computed, such as radio receivers designed to receive radio, longwave, standard-frequency time signals broadcasted by a DCF77 radio station.

STATE OF THE ART

As is known, nowadays GNSS receivers are the user interfaces to any GNSS and allow Signals in Space (SIS) broadcasted by a GNSS satellite constellation to be received, and Position, Velocity, and Time (PVT) to be computed based thereon.

Civil aviation community imposes stringent requirements on precision, integrity, continuity and availability of GNSS services. One of the most essential aspects relies on integrity and its impact on safety, the major driver in civil aviation. GNSS integrity is the capability of providing timely warnings to users when a GNSS service should not be used. These drivers have pushed GNSS community to look for solutions that could guarantee integrity in the civil aviation domain, such as Receiver Autonomous Integrity Monitoring (RAIM).

OBJECT AND SUMMARY OF THE INVENTION

The Applicant has noticed that GNSS receivers compute integrity information directly based on the SIS, while accuracy of the computed PVT is estimated based the redundancy of the received SIS. Therefore, no security check is available to determine SIS corruption or spoofing and, hence, current GNSS receivers fail to ensure that the PVT are reliable and trustable.

The aim of the present invention is therefore to provide a technology that allows the aforementioned drawbacks to be overcome, in particular a technology that allows a reliable Reference Time Scale to be trustily disseminated to User Terminals.

This aim is achieved by the present invention, which relates to a Reference Time Scale Dissemination System as claimed in the appended claims.

DETAILED DESCRIPTION OF PREFERRED EMBODIMENTS OF THE INVENTION

The following description is provided to enable a person skilled in the art to make and use the invention. Various modifications to the embodiments will be readily apparent to those skilled in the art, without departing from the scope of the claimed invention. Thus, the present invention is not intended to be limited to the embodiments shown, but is to be accorded the widest scope consistent with the principles and features disclosed herein and defined in the appended claims.

Unless otherwise defined, all technical and scientific terms used herein have the same meaning as commonly understood by one of ordinary skill in the art to which the embodiments disclosed belongs. In the case of conflict, the present specification, including definitions, will control. In addition, the examples are illustrative only not intended to be limiting. In particular, the block diagrams depicted in the Figures and described are not to be construed to represent structural features, namely constructive limitations, but are to be construed to represent functional features, namely intrinsic properties of devices defined by the achieved effects or functional limitations and that may be implemented with different structures, so protecting the functionalities thereof (possibility to function).

For the purposes of promoting understanding of the embodiments described herein, reference will be made to certain embodiments and specific language will be used to describe the same. The terminology used herein is for the purpose of describing particular embodiments only, and is not intended to limit the scope of the present disclosure.

The basic idea underlying the present invention is to trustily disseminate a Reference Time Scale to User Terminals equipped with GNSS Receivers, so as to cause User Terminal Time Scales provided by User Terminal Clock Devices to reliably replicate the disseminated Reference Time Scale.

This goal is achieved by providing User Terminals with Reference Time Scale Dissemination Data indicative of the extent to which the GNSS Time Scale computed by the User Terminals differs from the Reference Time Scale, and based on which the User Terminal Local Time Scales may be corrected to reliably replicate the disseminated Reference Time Scale.

Figure 1:
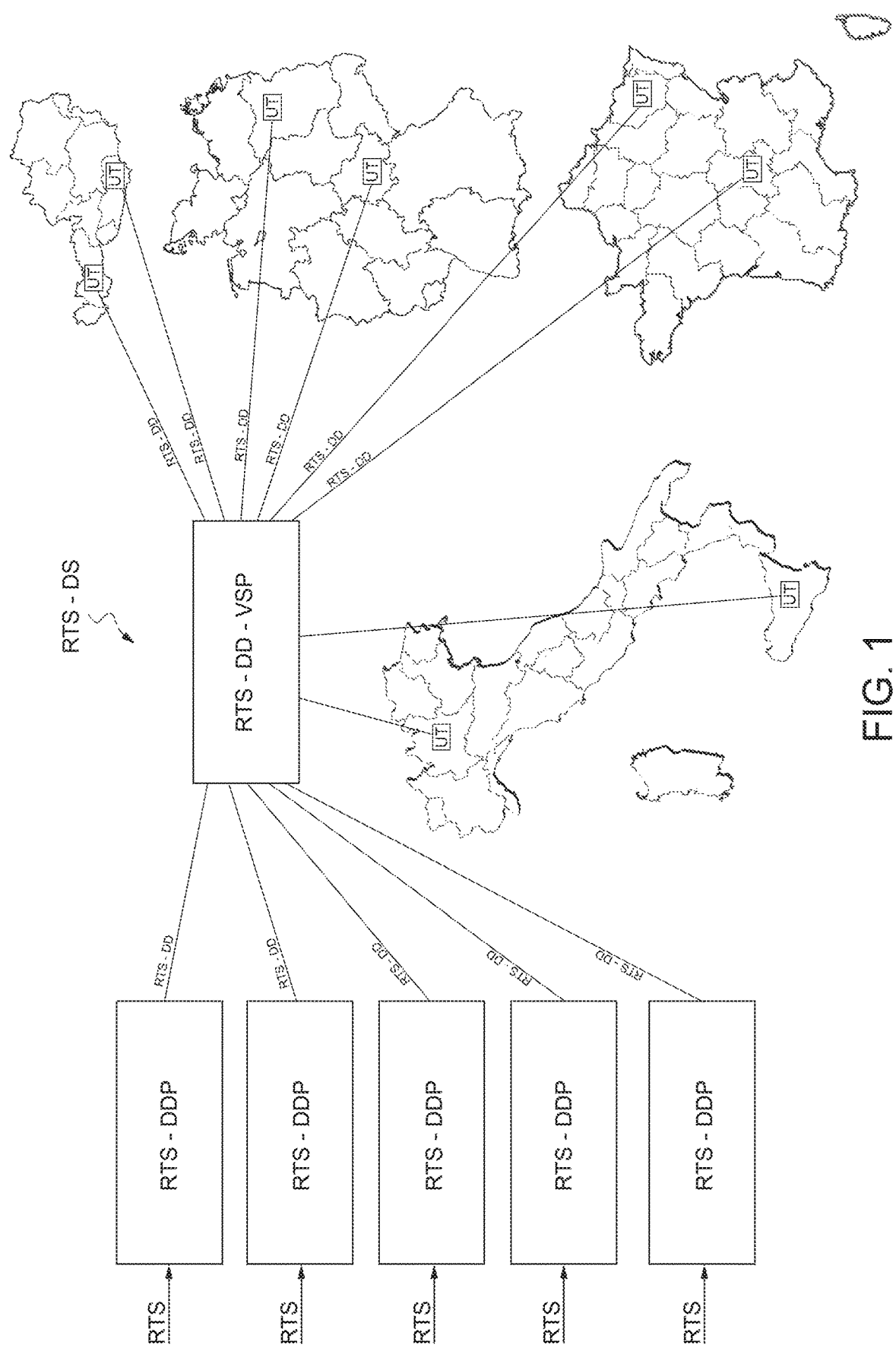
FIG. 1 shows a high-level block diagram of a Multi-Country implementation of a Reference Time Scale Dissemination System according to the present invention.

A high-level block diagram of a Reference Time Scale (RTS) Dissemination System (RTS-DS) according to the present invention is shown in FIG. 1, where a multi-country application is exemplarily considered, without losing generality.

The RTS Dissemination System comprises:

a Reference Time Scale (RTS) Dissemination Data Provider (RTS-DDP) designed to receive a Reference Time Scale to be disseminated to UTs and to compute RTS Dissemination Data (RTS-DD) to be disseminated to UTs so as to cause the UTs to reliably replicate the disseminated Reference Time Scale, a Reference Time Scale (RTS) Dissemination Data (RTS-DD) Validation Service Provider (RTS-DD-VSP) designed to provide a RTS-DD Validation Service and to receive from the RTS Dissemination Data Provider and validate received RTS Dissemination Data, and transmit validated RTS Dissemination Data to the UTs, and User Terminals (UTs) subscribed to the RTS-DD Validation Service and designed to receive from the RTS-DD Validation Service Provider and process validated RTS Dissemination Data to reliably replicate the disseminated Reference Time Scale.

The RTS Dissemination Data Provider, the RTS-DD Validation Service Provider and the UTs are each equipped with GNSS Receivers designed to receive GNSS SIS broadcasted by a GNSS satellite constellation, and to compute a GNSS Time Scale based on received GNSS SIS.

The RTS-DD Validation Service Provider is further equipped with an Internal Clock Device locked to a RTS-DD-VSP GNSS Time Scale computed by the RTS-DD Validation Service Provider based on received GNSS SIS and providing a RTS-DD-VSP Local Time Scale resultingly locked to the a RTS-DD-VSP GNSS Time Scale.

Similarly, each UT is further equipped with an Internal Clock Device locked to a UT GNSS Time Scale computed by the UT based on received GNSS SIS and providing a UT Local Time Scale resultingly locked to the UT GNSS Time Scale.

Figure 2:
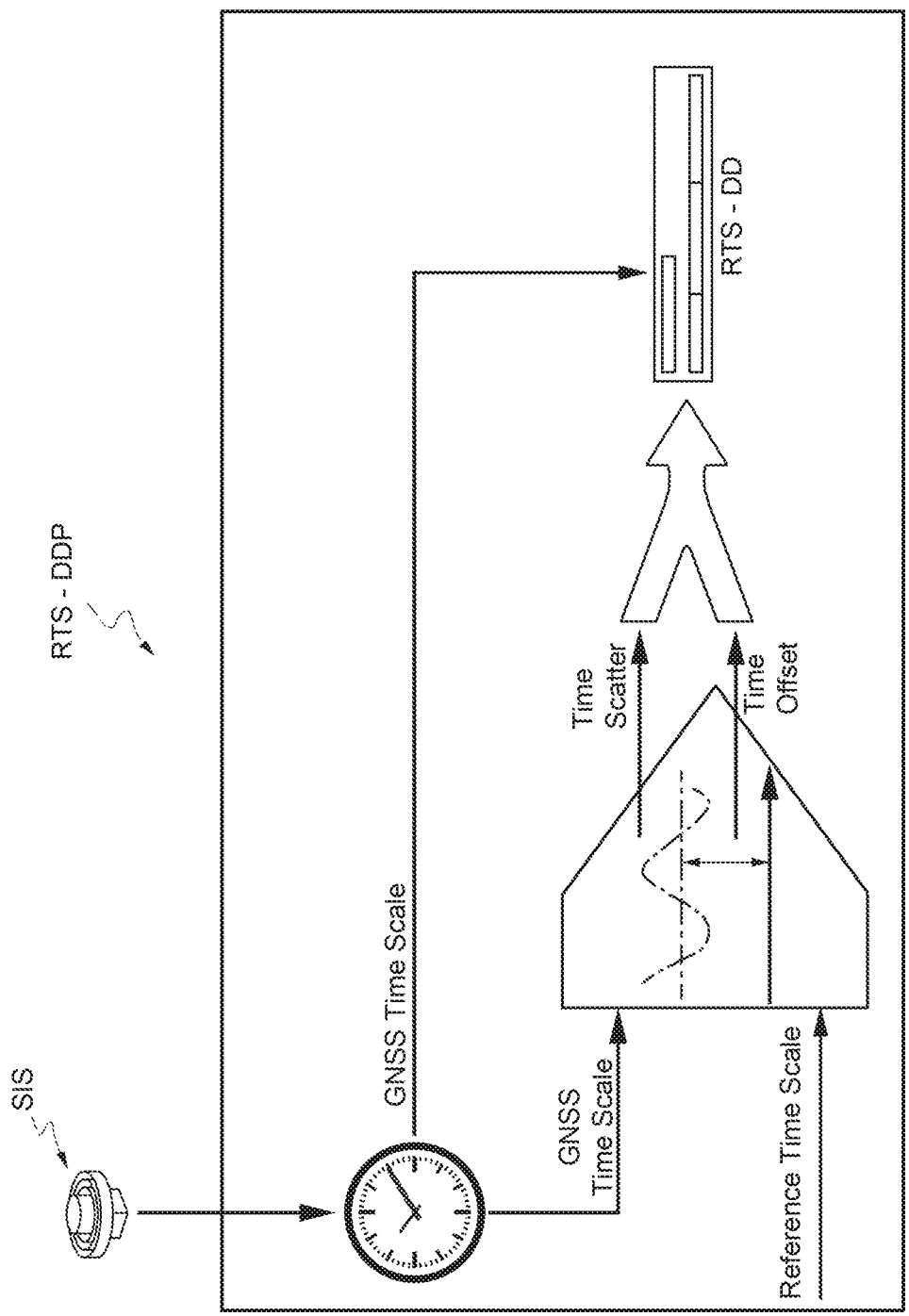
FIG. 2 shows a functional block diagram of a Reference Time Scale Dissemination Data Provider in the Reference Time Scale Dissemination System.

A functional block diagram of the RTS Dissemination Data Provider is shown in FIG. 2.

The RTS Dissemination Data Provider is designed to:

receive a Reference Time Scale from a Reference Time Scale Provider (not shown), such as the Reference Time Scale commonly known as UTC(k) Time Scale broadcasted by a national metrology institute and consisting of a national representation of an International Time Scale also known as Coordinated Universal Time (UTC), or the Reference Time Scale commonly known as TAI (from Temps Atomique International) Time Scale, or even a Reference Time Scale provided by any public/private company/institution/authority in order for it to be disseminated to UTs of its own employees/collaborators, etc., compute a RTS-DDP GNSS Time Scale based on received GNSS SIS, and at a (scheduled) RTS-DDP GNSS Time, hereinafter referenced by subscript i, compute Time Quantities indicative of the difference between the computed RTS-DDP GNSS Time Scale and the received Reference Time Scale, and comprising:

a Time Scatter indicative of a difference between the RTS-DDP GNSS Time and a corresponding Reference Time, and a Time Offset indicative of a mean value, computed over a timespan (preceding or across the RTS-DDP GNSS Time), of a number of differences between RTS-DDP GNSS Times and corresponding Reference Times, and transmit to the RTS-DD Validation Service Provider RTS Dissemination Data containing the computed Time Quantities, the RTS-DDP GNSS Time when the Time Quantities are computed, and the RTS-DDP GNSS Time when the RTS Dissemination Data is transmitted to the RTS-DD Validation Service Provider.

RTS Dissemination Data may be scheduled to be computed at a frequency that depends on the performance that is to be guaranteed at the UTs and that depends on the subscribed Data Validation Service, as well as the computed RTS Dissemination Data may be scheduled to be transmitted individually, once computed, or in batches, at a frequency that depends on the performance that is to be guaranteed at the UTs and that depends on the subscribed Data Validation Service.

In particular, the Time Scatter and the Time Offset may be computed as follows:

$$T_{Mi} = T_{Si} - T_{Ri}$$

$$T_{Oi} = \frac{1}{k}\sum_{j=1}^{k}(T_{Sj} - T_{Rj})$$

where:

$T_{Si}$ is the RTS-DDP GNSS Time i $T_{Ri}$ is the Reference Time @ RTS-DDP GNSS Time i $T_{Mi}$ is the Time Scatter @ RTS-DDP GNSS Time i $T_{Oi}$ is the Time Offset @ RTS-DDP GNSS Time i k is a cardinality of the set of differences between the RTS-DDP GNSS Times and the Reference Time based on which the Time Offset is computed.

Figure 3:
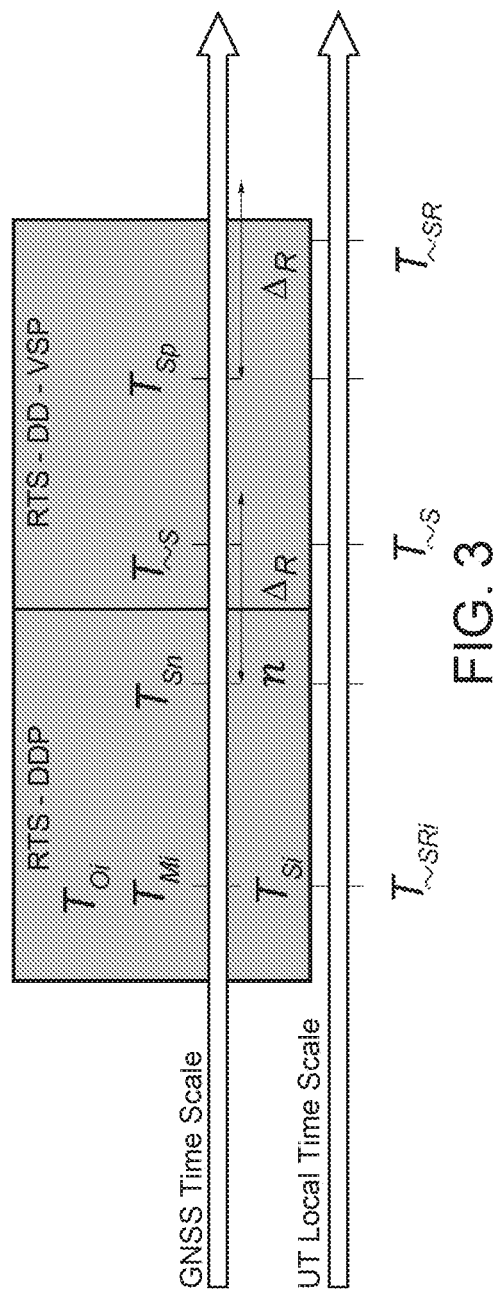
FIG. 3 shows a graphical timeline representation of a chronological sequence of events occurring during operation of the Reference Time Scale Dissemination System.
Figure 4:
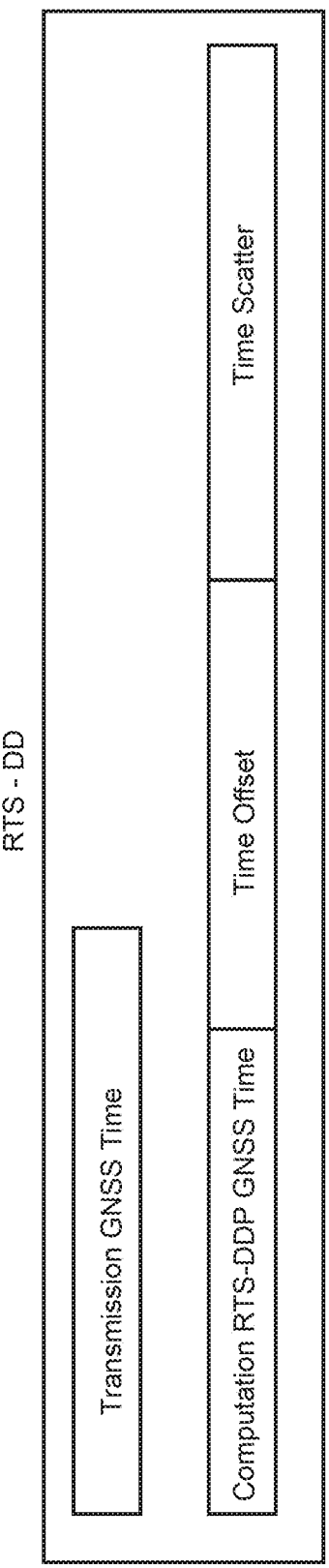
FIG. 4 shows Reference Time Scale Dissemination Data disseminated by the Reference Time Scale Dissemination System.

FIG. 3 shows a timeline graphical representation of the chronological sequence of events occurring during operation of the RTS Dissemination System, while FIG. 4 shows RTS Dissemination Data.

Figure 5:
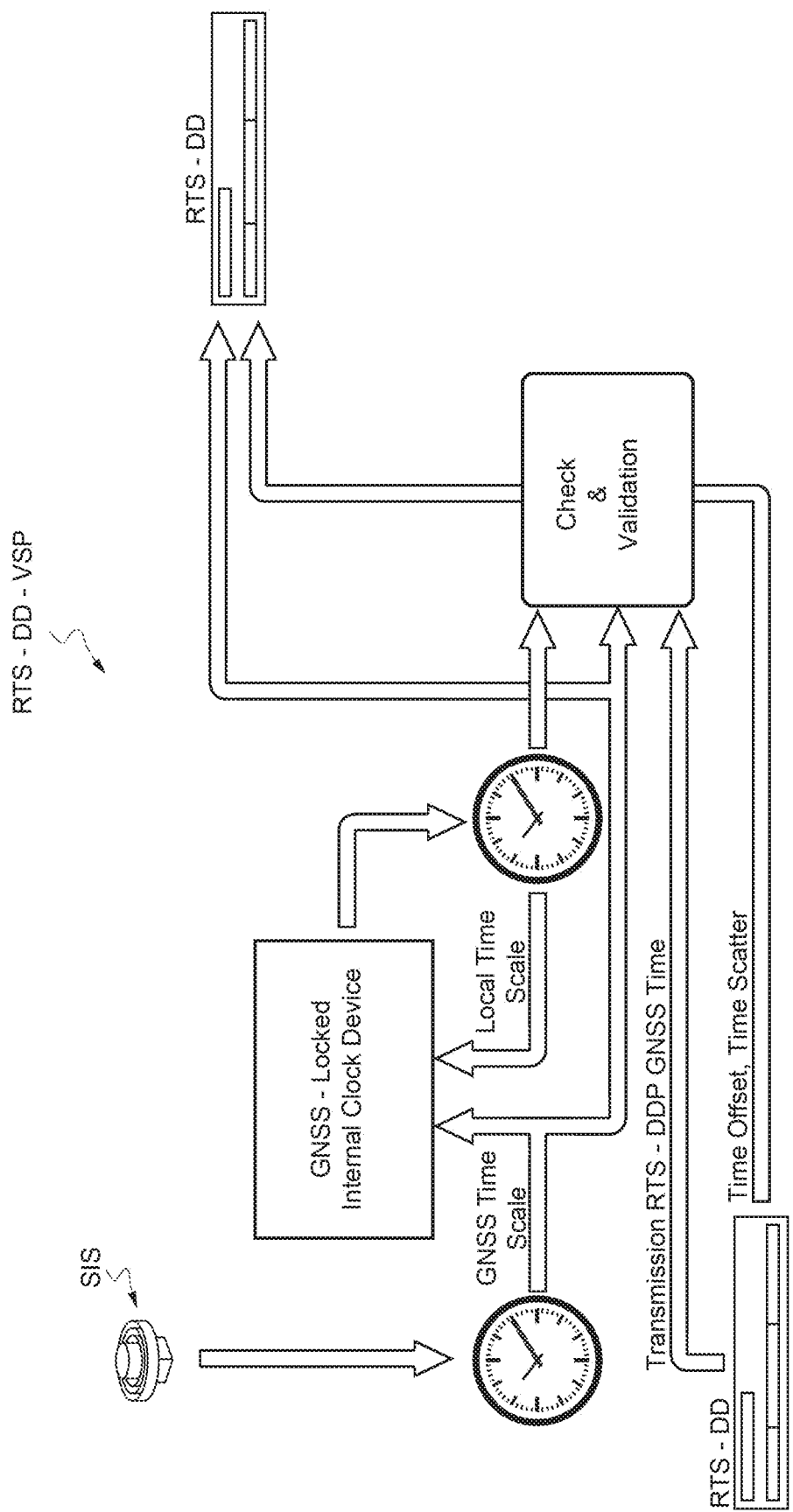
FIG. 5 shows a functional block diagram of a Reference Time Scale Dissemination Data Validation Service Provider in the Reference Time Scale Dissemination System.

A functional block diagram of the RTS-DD Validation Service Provider is shown in FIG. 5.

The RTS-DD Validation Service Provider is designed to:

receive RTS Dissemination Data transmitted by the RTS Dissemination Data Provider, compute a RTS-DD-VSP GNSS Time Scale based on received GNSS SIS, check whether the RTS Dissemination Data is received by the RTS-DD Validation Service Provider within a given timespan (maximum acceptable transmission delay) from the transmission by the RTS Dissemination Data Provider, based on the RTS-DD-VSP GNSS Time when the RTS Dissemination Data is received by the RTS-DD Validation Service Provider and the RTS-DDP GNSS Time when the RTS Dissemination Data is transmitted by the RTS Dissemination Data Provider and contained in the received RTS Dissemination Data, if the RTS Dissemination Data is determined to be received by the RTS-DD Validation Service Provider within the given timespan, compute at a RTS-DD-VSP GNSS Time, hereinafter referenced by subscript i, corresponding to the RTS-DDP GNSS Time i at which the Time Quantities contained in the received RTS Dissemination Data are computed:

a first quantity indicative of a difference between the RTS-DD-VSP GNSS Time and the RTS-DD-VSP Local Time, and a second quantity indicative of a difference between the Time Scatter and the Time Offset contained in the received RTS Dissemination Data, check whether a validation criterion is met by the first and second computed quantities, and if the validation criterion is determined to be met:
validate the received RTS Dissemination Data, and
transmit validated RTS Dissemination Data to the UTs, wherein the validated RTS Dissemination Data contains the computed Time Quantities, the RTS-DDP GNSS Time when the RTS Dissemination Data are computed, and the RTS-DD-VSP GNSS Time when the validated RTS Dissemination Data is transmitted to the UTs.

Conveniently, the validation criterion may be defined by the first and second computed quantities being approximately equivalent or equal, as follows:

$$T_{Si} - T_{\sim Si} \cong T_{Mi} - T_{Oi}$$

where:
$T_{Si}$ is the RTS-DD-VSP GNSS Time i
$T_{\sim Si}$ is the RTS-DD-VSP Local Time @ RTS-DD-VSP GNSS Time i
$T_{Mi}$ is the Time Scatter computed @ RTS-DDP GNSS Time i
$T_{Oi}$ is the Time Offset computed @ RTS-DDP GNSS Time i.

It may be further appreciated that:

the first computed quantity quantifies the amount of variation or dispersion of the Local Time Scale with respect to the GNSS Time Scale in the RTS-DD Validation Service Provider at the same time as when the Time Quantities are computed, the second computed quantity quantifies the amount of variation or dispersion of the GNSS Time Scale with respect to the Reference Time Scale in the RTS Dissemination Data Provider when the Time Quantities are computed, and checking whether the first and second computed quantities are approximately equivalent amounts to checking whether at the time when the Time Quantities are computed, the variation or dispersion of the Local Time Scale with respect to the GNSS Time Scale in the RTS-DD Validation Service Provider is approximately equal or equivalent to the variation or dispersion of the GNSS Time Scale with respect to the Reference Time Scale in the RTS-DDP.

Different appropriate validation criteria may conveniently be adopted.

Figure 6:
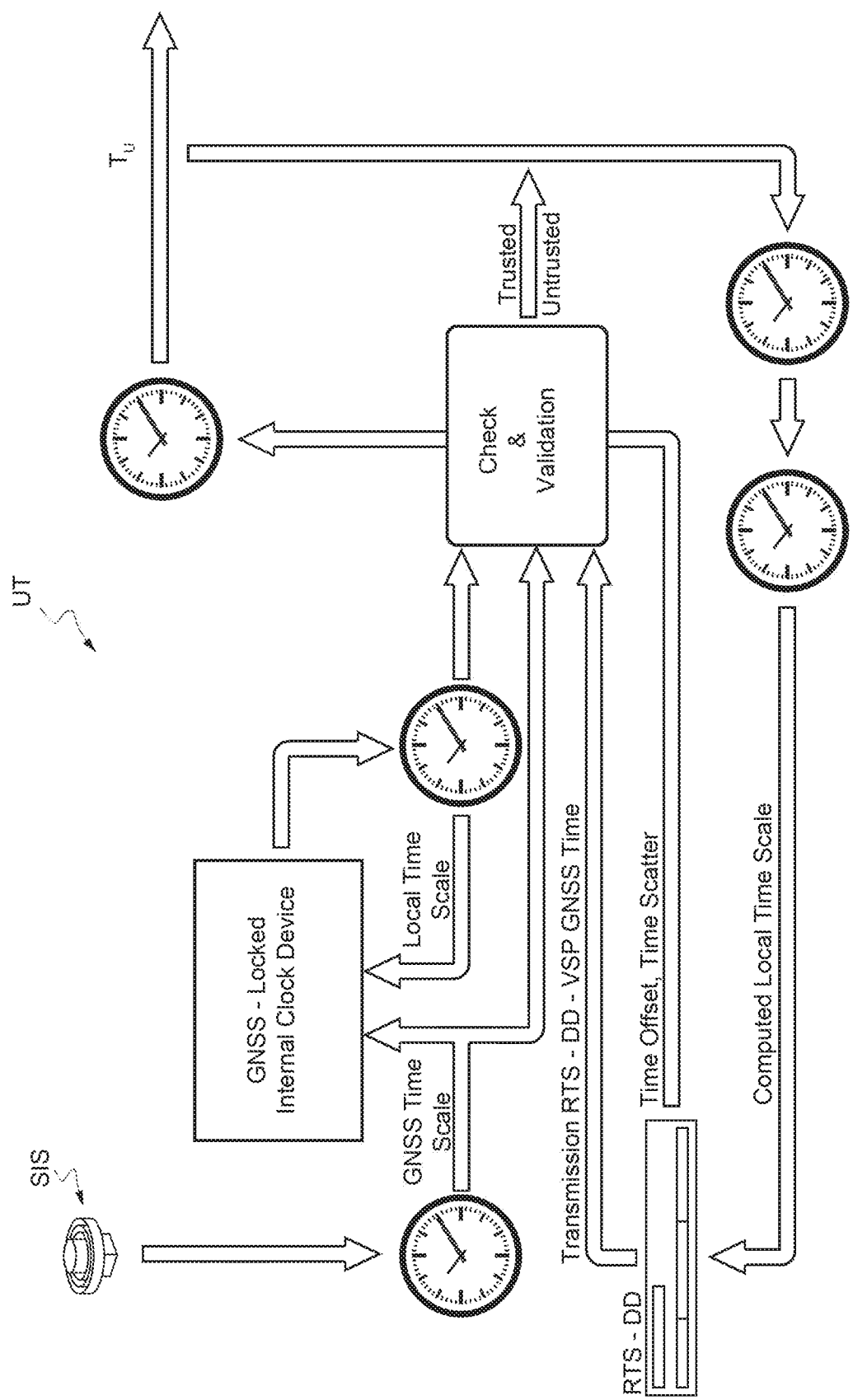
FIG. 6 shows a functional block diagram of a User Terminal to which a Reference Time Scale is disseminated.

A functional block diagram of a UT is shown in FIG. 6. The UT is designed to:

receive the validated RTS Dissemination Data transmitted by the RTS-DD Validation Service Provider, compute a UT GNSS Time Scale based on received GNSS SIS, check whether the received RTS Dissemination Data is received by the UT within a timespan (maximum acceptable transmission delay) from the transmission by the RTS-DD Validation Service Provider, based on the UT GNSS Time when the RTS Dissemination Data is received by the UT and the RTS-DD-VSP GNSS Time when the RTS Dissemination Data is transmitted by the RTS-DD Validation Service Provider and contained in the received validated RTS Dissemination Data, if the RTS Dissemination Data is determined to be received by the UT within the given timespan, compute, at a UT GNSS Time, hereinafter referenced by subscript i, corresponding to the RTS-DDP GNSS Time i at which the Time Quantities contained in the received validated RTS Dissemination Data are computed:

a first quantity indicative of a difference between the UT GNSS Time and the UT Local Time, and a second quantity indicative of a difference between the Time Scatter and the Time Offset contained in the received validated RTS Dissemination Data, check whether a validation criterion is met by the first and second computed quantities, and if the validation criterion is determined to be met:
compute a UT RTS-Aligned Time Scale in time alignment with the disseminated Reference Time Scale based on the Time Offset contained in the received validated RTS Dissemination Data, and expose the UT RTS-Aligned Time Scale, along with an indication that the exposed UT RTS-Aligned Time Scale is trusted, namely is in time alignment with the disseminated Reference Time Scale, if instead the validation criterion is determined not to be met,
expose the UT Local Time Scale to the User, along with an indication that the exposed UT Local Time Scale may not be trusted, namely may not in time alignment with the disseminated Reference Time Scale.

Conveniently, the validation criterion may be defined by the first and second computed quantities being approximately equivalent or equal, as follows:

$$T_{SRi} - T_{\sim SRi} \cong T_{Mi} - T_{Oi}$$

where:
$T_{SRi}$ is the UT GNSS Time i
$T_{\sim SRi}$ is the UT Local Time @ UT GNSS Time i
$T_{Mi}$ is the Time Scatter computed @ RTS-DDP GNSS Time i
$T_{Oi}$ is the Time Offset computed @ RTS-DDP GNSS Time i.

Different appropriate validation criteria may conveniently be adopted.

The exposed UT RTS-Aligned Time Scale may be computed as follows:

$$T_U = T_{\sim SR} - T_{Oi}$$

where:
$T_U$ is the UT RTS-Aligned Time Scale
$T_{\sim SR}$ is the UT Local Time Scale
$T_{Oi}$ is the Time Offset @ RTS-DDP GNSS Time i.

The UT may be further designed to validate the exposed UT RTS-Aligned Time Scale by:

computing a UT Local Time Scale $T_{\sim SR}$ based on the exposed UT RTS-Aligned Time Scale $T_U$ and on the RTS-DDP Time Offset computed at a preceding RTS-DDP GNSS Time i−1 and contained in the previously received RTS Dissemination Data:

$$T_{\sim SR} = T_U + T_{Oi-1}$$

checking if the following validation criterion is met @ UT GNSS Time when the RTS Distribution Data is received by the UT:

$$(T_{\sim SR} - T_{Sp}) < \Delta_R$$

where:
$T_{Sp}$ is the RTS-DD-VSP GNSS Time when the validated RTS Dissemination Data is transmitted to the UTs and contained in the received RTS Distribution Data $\Delta_R$ is the timespan (maximum acceptable transmission delay) within which the validated RTS Dissemination Data are checked to be received by the UT from the transmission of the validated RTS Dissemination Data by the RTS-DD Validation Service Provider, validating the exposed UT RTS-Aligned Time Scale if the validation criterion is determined to be met.

In view of the foregoing, it may be appreciated that the RTS Dissemination System according to the present invention allows a Reference Time Scale to be trustily disseminated to the UTs by transmitting, and validating the transmission of, Time Offsets and Time Scatters of the GNSS Time Scale with respect to the Reference Time Scale computed at the RTS Dissemination Data Provider, so as to cause the UT Local Time Scales to reliably replicate the disseminated Reference Time Scale.

Two main categories of UTs may benefit from the trusted Reference Time Scale dissemination according to the present invention. A first category comprises those UTs that need a reliable local time scale for billing or service availability/quality verification purposes, such as Power Utilities, Telephony, Motorways, Parking, Banking, etc., while a second category comprises those UTs that need a reliable local time scale to trace the development of an activity by timestamping the steps thereof for investigation purposes in case of disaster, such as Railways, Underground, Airport logistics (location supplement), Air Transportation, Logistics, Self-Driving Motor Vehicles (location supplement), etc.

It may be appreciated that various modifications may be made to the above-described embodiment. In a different embodiment, the RTD-DD Validation Service Provider may be omitted and the RTS Dissemination Data necessary to the UTs to replicate the Reference Time Scale may be broadcasted directly by the RTS Dissemination Data Provider.

The invention claimed is:

1. A Reference Time Scale (RTS) Dissemination System (RTS-DS) comprising:
a RTS Dissemination Data Provider (RTS-DDP), and
a User Terminal (UT);
wherein the RTS Dissemination Data Provider (RTS-DDP) is equipped with a Radio Receiver designed to receive radio signals and to compute a RTS-DDP Computed Time Scale based on received radio signals;
wherein the User Terminal (UT) is equipped with a Radio Receiver designed to receive radio signals and to compute a UT Computed Time Scale based on received radio signals, and with a Clock Device designed to be locked to the UT Computed Time Scale and to provide a UT Local Time Scale resultingly locked to the UT Computed Time Scale;
wherein the RTS Dissemination Data Provider (RTS-DDP) is designed to:
receive a Reference Time Scale (RTS),
compute, at a RTS-DDP Computed Time, Time Quantities indicative of a difference between the RTS-DDP Computed Time Scale and the received Reference Time Scale, and comprising:
a Time Scatter indicative of a difference between the RTS-DDP Computed Time and a corresponding Reference Time, and
a Time Offset indicative of a mean value, computed over a timespan, of a number of differences between RTS-DDP Computed Times and corresponding Reference Times, and
transmit RTS Dissemination Data containing the computed Time Quantities, the RTS-DDP Computed Time when the Time Quantities are computed, and the RTS-DDP Computed Time when the RTS Dissemination Data is transmitted;
wherein the User Terminal (UT) is designed to:
receive transmitted RTS Dissemination Data,
compute, at a UT Computed Time corresponding to the RTS-DDP Computed Time when the Time Quantities are computed:
a first quantity indicative of a difference between the UT Computed Time and a corresponding UT Local Time, and
a second quantity indicative of a difference between the Time Scatter and the Time Offset contained in the received RTS Dissemination Data,
check whether a validation criterion is met by the first and second computed quantities,
wherein:
if the validation criterion is determined to be met:
compute a UT RTS-Aligned Time Scale in time alignment with the Reference Time Scale based on the Time Offset contained in the received RTS Dissemination Data, and
expose the UT RTS-Aligned Time Scale, along with an indication that the exposed UT RTS-Aligned Time Scale is in time alignment with the Reference Time Scale and an indication that the exposed UT RTS-Aligned Time Scale is trusted; and
if the validation criterion is determined not to be met:
expose the UT Local Time Scale to the UT, along with an indication that the exposed UT Local Time Scale is not in time alignment with the Reference Time Scale and an indication that the exposed UT Local Time Scale cannot be trusted.

2. The Reference Time Scale (RTS) Dissemination System (RTS-DS) of claim 1, wherein the User Terminal (UT) is further designed to:
check whether the RTS Dissemination Data is received by the User Terminal (UT) within a timespan from transmission of the RTS Dissemination Data, based on the UT Computed Time when the RTS Dissemination Data is received by the User Terminal (UT) and a Computed Time when the RTS Dissemination Data is transmitted to the User terminal (UT) and contained in the RTS Dissemination Data, and
compute the first and second quantities and check whether the validation criterion is met by the first and second computed quantities if the RTS Dissemination Data is determined to be received within the timespan.

3. The Reference Time Scale (RTS) Dissemination System (RTS-DS) of claim 1, further comprising a RTS-DD Validation Service Provider (RTS-DD-VSP) designed to provide a RTD-DD Validation Service and equipped with a Radio Receiver designed to receive radio signals and to compute a RTS-DD-VSP Computed Time Scale based on received radio signals, and with a Clock Device designed to be locked to the RTS-DD-VSP Computed Time Scale and to provide a RTS-DD-VSP Local Time Scale resultingly locked to the RTS-DD-VSP Computed Time Scale;
wherein the RTS-DD Validation Service Provider (RTS-DD-VSP) is further designed to:
receive RTS Dissemination Data transmitted by the RTS Dissemination Data Provider (RTS-DDP), compute, at a RTS-DD-VSP Computed Time corresponding to the RTS-DDP Computed Time at which the Time Quantities are computed:
a first quantity indicative of a difference between the RTS-DD-VSP Computed Time and a corresponding RTS-DD-VSP Local Time, and
a second quantity indicative of a difference between the Time Scatter and the Time Offset contained in the received RTS Dissemination Data,
check whether a validation criterion is met by the first and second computed quantities,
if the validation criterion is determined to be met:
validate the received RTS Dissemination Data, and
transmit the validated RTS Dissemination Data to the User Terminal (UT), wherein the transmitted validated RTS Dissemination Data contains the computed Time Quantities, the RTS-DDP Computed Time when the Time Quantities are computed, and the RTS-DD-VSP Computed Time when the validated RTS Dissemination Data is transmitted by the RTS-DD Validation Service Provider (RTS-DD-VSP) to the User Terminal (UT).

4. The Reference Time Scale (RTS) Dissemination System (RTS-DS) of claim 3, wherein the RTS-DD Validation Service Provider (RTS-DD-VSP) is further designed to:
check whether the RTS Dissemination Data is received by the RTS-DD Validation Service Provider (RTS-DD-VSP) within a timespan from transmission of the RTS Dissemination Data by the RTS Dissemination Data Provider (RTS-DDP), based on the RTS-DD-VSP Computed Time when the RTS Dissemination Data is received by the RTS-DD Validation Service Provider (RTS-DD-VSP) and the RTS-DDP Computed Time when the RTS Dissemination Data is transmitted by the RTS Dissemination Data Provider (RTS-DDP) to the RTS-DD Validation Service Provider (RTS-DD-VSP) and contained in the received RTS Dissemination Data, and
compute the first and second quantities and check whether the validation criterion is met by the first and second computed quantities if the RTS Dissemination Data is determined to be received within the timespan.

5. The Reference Time Scale (RTS) Dissemination System (RTS-DS) of claim 1, wherein the validation criterion is defined by the first and second computed quantities being approximately equivalent.

6. The Reference Time Scale (RTS) Dissemination System (RTS-DS) of claim 1, wherein the RTS Dissemination Data Provider (RTS-DDP) is further designed to transmit the RTS Dissemination Data directly to the User Terminal (UT); and wherein the User Terminal (UT) is further designed to:
check whether the RTS Dissemination Data is received by the User Terminal (UT) within a timespan from transmission of the RTS Dissemination Data by the RTS Dissemination Data Provider (RTS-DDP), based on the UT Computed Time when the RTS Dissemination Data is received by the User Terminal (UT) and the RTS-DDP Computed Time when the RTS Dissemination Data is transmitted by the RTS Dissemination Data Provider (RTS-DDP) to the User terminal (UT) and contained in the received RTS Dissemination Data, and
compute the first and second quantities and check whether the validation criterion is met by the first and second computed quantities if the RTS Dissemination Data is determined to be received within the timespan.

7. The Reference Time Scale (RTS) Dissemination System (RTS-DS) of claim 1, wherein the User Terminal (UT) is further designed to validate the exposed UT RTS-Aligned Time Scale by:
computing a UT Local Time Scale based on the exposed UT RTS-Aligned Time Scale and on the RTS-DDP Time Offset computed at a preceding RTS-DDP Computed Time and contained in previously received RTS Dissemination Data,
at the UT Computed Time when the RTS Distribution Data is received by the UT, checking whether a RTS Dissemination Data is received by the User Terminal (UT) within a timespan from transmission of the RTS Dissemination Data by a RTS-DD Validation Service Provider (RTS-DD-VSP), based on the UT Local Time computed by the UT and the RTS-DD-VSP Computed Time when the RTS Dissemination Data is transmitted by the RTS-DD Validation Service Provider (RTS-DD-VSP) and contained in the received RTS Dissemination Data, and
validating the exposed UT RTS-Aligned Time Scale if the check has a positive outcome.

8. The Reference Time Scale (RTS) Dissemination System (RTS-DS) of claim 1, wherein the Time Scatter and the Time Offset are computed as follows:

$$T_{Mi} = T_{Si} - T_{Ri}$$

$$T_{Oi} = \frac{1}{k}\sum_{j=1}^{k}(T_{Sj} - T_{Rj})$$

where:
$T_{Si}$ is the RTS-DDP Computed Time i
$T_{Ri}$ is the Reference Time @ RTS-DDP Computed Time i,
$T_{Mi}$ is the Time Scatter @ RTS-DDP Computed Time i
$T_{Oi}$ is the Time Offset @ RTS-DDP Computed Time i
k is a cardinality of the set of differences between the RTS-DDP Computed Times and the Reference Times based on which the Time Offset is computed.

9. A Reference Time Scale (RTS) Dissemination Data Provider (RTS-DDP), a RTS Dissemination Data Validation Service Provider (RTS-DD-VSP), and a User Terminal (UT) designed to cooperate in implementing the Reference Time Scale (RTS) Dissemination System (RTS-DS) of claim 1.

10. Software loadable in a Reference Time Scale (RTS) Dissemination Data Provider (RTS-DDP), a RTS Dissemination Data Validation Service Provider (RTS-DD-VSP), and a User Terminal (UT), and designed to cause, when executed, the Reference Time Scale (RTS) Dissemination Data Provider (RTS-DDP), a RTS Dissemination Data Validation Service Provider (RTS-DD-VSP), and a User Terminal (UT) to become configured to cooperate in implementing the Reference Time Scale (RTS) Dissemination System (RTS-DS) of claim 1.

11. The Reference Time Scale (RTS) Dissemination System (RTS-DS) of claim 1, wherein the transmission of the RTS Dissemination Data from the RTS-DDP to the UT is unidirectional.

12. A non-transitory computer-readable medium storing instructions for implementing a Reference Time Scale (RTS) Dissemination System (RTS-DS) that are executable by a processing device, wherein the Reference Time Scale (RTS) Dissemination System (RTS-DS) includes (i) a RTS Dissemination Data Provider (RTS-DDP), and (ii) a User Terminal (UT), wherein the RTS Dissemination Data Provider (RTS-DDP) is equipped with a Radio Receiver, and the User Terminal (UT) is equipped with a Radio Receiver and a Clock Device, wherein execution of the instructions by the processing device causes the processing device to:
- receive radio signals at the RTS Dissemination Data Provider (RTS-DDP) with the Radio Receiver and compute a RTS-DDP Computed Time Scale based on the received radio signals;
- receive radio signals at the User Terminal (UT) with the Radio Receiver, compute a UT Computed Time Scale based on the received radio signals, lock the Clock Device to the UT Computed Time Scale, and provide a UT Local Time Scale resultingly locked to the UT Computed Time Scale;
- receive a Reference Time Scale (RTS) at the RTS Dissemination Data Provider (RTS-DDP);
- compute with the RTS Dissemination Data Provider (RTS-DDP), at a RTS-DDP Computed Time, Time Quantities indicative of a difference between the RTS-DDP Computed Time Scale and the received Reference Time Scale, including (i) a Time Scatter indicative of a difference between the RTS-DDP Computed Time and a corresponding Reference Time, and (ii) a Time Offset indicative of a mean value, computed over a timespan, of a number of differences between RTS-DDP Computed Times and corresponding Reference Times;
- transmit with the RTS Dissemination Data Provider (RTS-DDP) RTS Dissemination Data containing the computed Time Quantities, the RTS-DDP Computed Time when the Time Quantities are computed, and the RTS-DDP Computed Time when the RTS Dissemination Data is transmitted;
- receive at the User Terminal (UT) transmitted RTS Dissemination Data,
- compute at the User Terminal (UT), at a UT Computed Time corresponding to the RTS-DDP Computed Time when the Time Quantities are computed (i) a first quantity indicative of a difference between the UT Computed Time and a corresponding UT Local Time, and (ii) a second quantity indicative of a difference between the Time Scatter and the Time Offset contained in the received RTS Dissemination Data; and
- check at the User Terminal (UT) whether a validation criterion is met by the first and second computed qualities, wherein:
  - if the validation criterion is determined to be met:
    - compute a UT RTS-Aligned Time Scale in time alignment with the Reference Time Scale based on the Time Offset contained in the received RTS Dissemination Data, and
    - expose the UT RTS-Aligned Time Scale, along with an indication that the exposed UT RTS-Aligned Time Scale is in time alignment with the Reference Time Scale and an indication that the exposed UT RTS-Aligned Time Scale is trusted; and if the validation criterion is determined not to be met:
    - expose the UT Local Time Scale to the UT, along with an indication that the exposed UT Local Time Scale is not in time alignment with the Reference Time Scale and an indication that the exposed UT Local Time Scale cannot be trusted.

\* \* \* \* \*